UNITED STATES PATENT OFFICE.

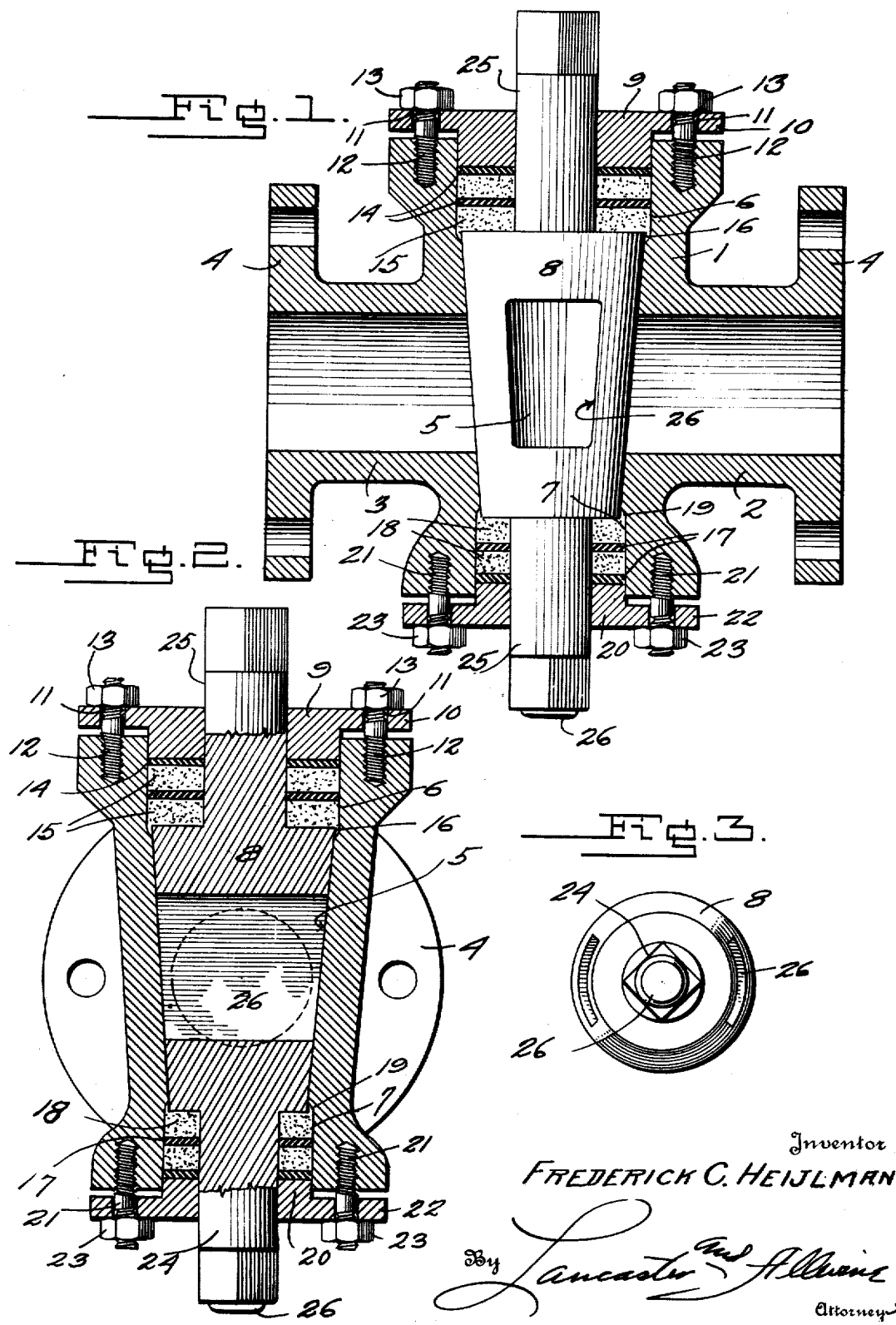

FREDERICK C. HEIJLMAN, OF MARTINEZ, CALIFORNIA.

STOPCOCK.

1,370,745.

Specification of Letters Patent.

Patented Mar. 8, 1921.

Application filed October 11, 1917. Serial No. 196,000.

*To all whom it may concern:*

Be it known that I, FREDERICK C. HEIJLMAN, a citizen of Holland, and a resident of Martinez, in the county of Contra Costa and State of California, have invented certain new and useful Improvements in Stopcocks, of which the following is a specification.

This invention relates to stop-cocks or shut-off valves, and the primary object of the invention is to provide an improved construction for valves of this character whereby leakage will be prevented when the valve is used in connection with either steam or liquid.

One of the objects of the invention is to provide an improved valve of this character that may be easily disengaged from its valve seat when the tendency of the valve proper is to adhere to seat as when the valve is employed with liquid which tends to cause the valve to tightly cling to its seat as when acid or similar liquids are employed.

The invention has for a further object to provide a device having a longitudinally adjustable tapered valve carrying oppositely projecting valve stems whereby the valve may be properly adjusted from either end of the valve casing; which include packing boxes at both ends of the said valve whereby leakage from either end of the valve casing can be prevented without changing the relative position of the valve with respect to its seat; and which may be moved to various positions and made water-tight so that an effective seating of the valve will be maintained at all times.

A further object of the invention is to provide a valve of this character which will consist of comparatively few parts and is simple in construction, but durable and especially adapted to withstand the rough usage to which devices of this kind are ordinarily subjected.

For a full description of the invention and the advantages and merits thereof, reference is to be had to the following detailed description and the accompanying drawing wherein is illustrated the preferred form of the invention and, in which—

Figure 1 is a vertical section through the valve body showing the invention in assembled position.

Fig. 2 is a transverse section, and

Fig. 3 is a bottom plan view of the valve member.

Referring to the drawing, wherein is illustrated the preferred form of the invention and in which like characters of reference indicate corresponding parts throughout the several views, the valve casing 1 is provided with the oppositely projecting portions 2 and 3 which form the inlet and outlet for the valve and each of these projections have flanges 4 whereby the valve may be attached to the ends of piping for arranging the valve in connection with a system of pipes having steam or liquid conducted through their interiors. As shown in Fig. 2, the main portion of the valve body is tapered and has an interior tapered bore 5 extending through the valve body. The upper end of the valve body has an enlarged recess 6 which forms a packing box while a comparatively smaller recess 7 is formed in the opposite end of the valve body. Communication between these two recesses 6 and 7 is established through the tapered bore 5 and a tapered plug valve 8 is rotatably mounted in this tapered bore 5. Each of the recesses 6 and 7 are slightly larger than the corresponding end of the tapered bore as shown to advantage in Figs. 1 and 2. The plug valve 8 is slightly longer than the bore 5 so that normally the ends of the plug are projected slightly into each of the recesses 6 and 7.

A packing gland 9 is extended into one of the recesses at one end of the valve body and this gland has a flange 10 provided with openings 11 for the reception of the ends of studs 12 screw-threaded into screw-threaded recesses in the end of the valve body. Nuts 13 are adapted for reception on the ends of the studs whereby the gland may be forced into the recess 6. Interposed between the large end of the tapered plug valve 8 and the adjacent end of the gland is a series of layers of suitable packing which, in the present instance, is shown as including alternate layers of hard and soft packing material and taken in combination with the gland, provides an elastic thrust bearing for the end of the plug 8. This packing material is preferably of asbestos and includes the two compressed disks 14 and the loose intermediate asbestos packing 15. One of the washers 14 is in direct contact with the gland 9 while one of the portions of packing material 15 is in direct contact with the corresponding end of the plug 8. This construction permits a portion of the loose asbestos packing 15 to be pressed into the annular space 16 around the extreme end of the plug in the bottom of the recess 6 when a pressure is applied to the gland.

The opposite recess 7 is provided with a similar elastic thrust bearing for the opposite end of the plug 8 and comprises packing material which includes the relatively smaller packing disks 17 and the loose packing material 18, one layer of the latter being in engagement with the smaller end of the plug so that it may be pressed into the annular space 19 around the said end. This packing within the recess 17 is held in position by the gland 20 which is of a formation similar to the gland 9, being slightly smaller in size. Studs 21 are provided in this end of the valve body and the studs project through openings in the flange 22 of the gland and receive a nut 23 to press the gland into position within the recess 7 for tightly packing the packing material within the recess.

Each end of the plug 8 is provided with a stem indicated at 24 and 25 and each stem projects through the elastic thrust bearings whereby the terminal of each stem is extended beyond the valve casing and has a square portion for the reception of a wrench or the like, whereby the valve may be turned from either end. A passage way 26 in the plug 8 permits the plug to be moved to open or closed position.

The tapered bore 5 forms a valve seat with which the plug valve contacts to provide a water-tight joint. It will be apparent that continued use of the valve will have a tendency to reduce the effectiveness of tightly closing the bore and at such times it will be necessary to longitudinally adjust the plug valve for placing it in the proper position to tightly hold the bore. When this is desired it is simply necessary to turn either the nuts 13 or 23 to more compactly press the packing in the corresponding end of the body. When one gland is pressed inwardly to tightly pack the packing material the opposite gland will be correspondingly loosened to permit the packing in this end of the valve body to release its pressure on the end of the plug valve thus accomplishing the longitudinal adjustment of the valve. When the valve, for any reason, sticks or becomes immovable and tightly adheres to its seat, it is merely necessary to tap the end 25 of the stem 24 with a hammer or other suitable instrument to loosen the valve away in its seat or should the valve become loose in its seat a tapping on the upper end of the stem will properly seat it. The loose packing about the ends of the valve plug will lend itself to expansion or compression upon adjustment of the valve plug to maintain a fluid tight joint.

When the valve becomes worn after continued use, longitudinal adjustment may be accomplished as above stated and the alternate layers of compact and loose packing will tightly fill the packing boxes formed by the recesses 7 and 6 so that a water-tight valve is provided at all times.

From the foregoing it will be observed that a very simple and durable stop cock has been provided the details of which embody the preferred form. I desire to be understood, however, that slight changes may be made in the details of construction without departing from the spirit of the invention or the scope of the claims hereunto appended:—

What is claimed is:

1. A high pressure stop cock comprising a body having openings therethrough in two directions, one of which is ground to form a valve seat, a revoluble plug fitting said seat and having flat shoulders and operating handles at both ends, packing at both ends of the valve plug, flanged collars at both ends of the valve plug for holding the packing in place and means for securing the flanged collars in position, the operating handles of the valve plug extending through both of said flanged collars.

2. A high pressure stop cock comprising a valve body having two openings therethrough, one ground to form a valve seat, a cone valve plug having flat shoulders and operating handles at both ends, layers of packing at both ends of the valve plug, flanged collars for holding the layers of packing in place at both ends of the valve plug, means to secure the flanged collars to the valve body the operating handles extending through the flanged collars at both ends.

FREDERICK C. HEIJLMAN.